US005532475A

United States Patent [19]
Tonami et al.

[11] Patent Number: 5,532,475
[45] Date of Patent: Jul. 2, 1996

[54] METHOD AND APPARATUS FOR TWO-DIMENSIONAL RADIATION DETECTION

[75] Inventors: Hiromichi Tonami, Otokuni-gun; Sirou Oikawa, Shiga-gun, both of Japan

[73] Assignee: Shimadzu Corporation, Kyoto, Japan

[21] Appl. No.: 424,878

[22] Filed: Apr. 19, 1995

[30] Foreign Application Priority Data

Apr. 25, 1994 [JP] Japan .................................. 6-110399

[51] Int. Cl.⁶ .................................................. H01J 31/50
[52] U.S. Cl. .............................. 250/214 VT; 250/370.11; 313/524; 313/532
[58] Field of Search .................... 250/214 VT, 370.11, 250/591, 580; 313/523, 524, 532, 541

[56] References Cited

U.S. PATENT DOCUMENTS 3,835,314  9/1974  Grossel et al. .................... 250/214 VT
5,144,123  9/1992  Malashanko ............................ 313/532
5,329,116  7/1994  Colditz et al. .......................... 313/524
5,381,000  1/1995  McKee, Jr. ........................ 250/214 VT
5,483,071  1/1996  Oikawa et al. ..................... 250/370.11

*Primary Examiner*—Stephone Allen
*Attorney, Agent, or Firm*—Nikaido, Marmelstein, Murray & Oram

[57] ABSTRACT

A two-dimensional radiation detecting method and apparatus for converting incident radiation in a two-dimensional distribution into electric signals. The apparatus includes a target structure and an electron beam scan mechanism. The target structure has a fluorescent element, transparent electrodes in stripes and a photoconductive film laminated in the stated order on a substrate. The electron beam scan mechanism has a plurality of linear cathodes, backing electrodes for taking electron beams from a selected linear cathode, a vertically converging electrode, vertically deflecting electrodes, accelerating electrodes and a decelerating electrode. The electron beam scan mechanism simultaneously projects the electron beams distributed horizontally to one horizontal line on the photoconductive film, and then shifts the electron beams vertically, to read a two-dimensional distribution of potentials on the photoconductive film.

9 Claims, 4 Drawing Sheets

F I G. 3
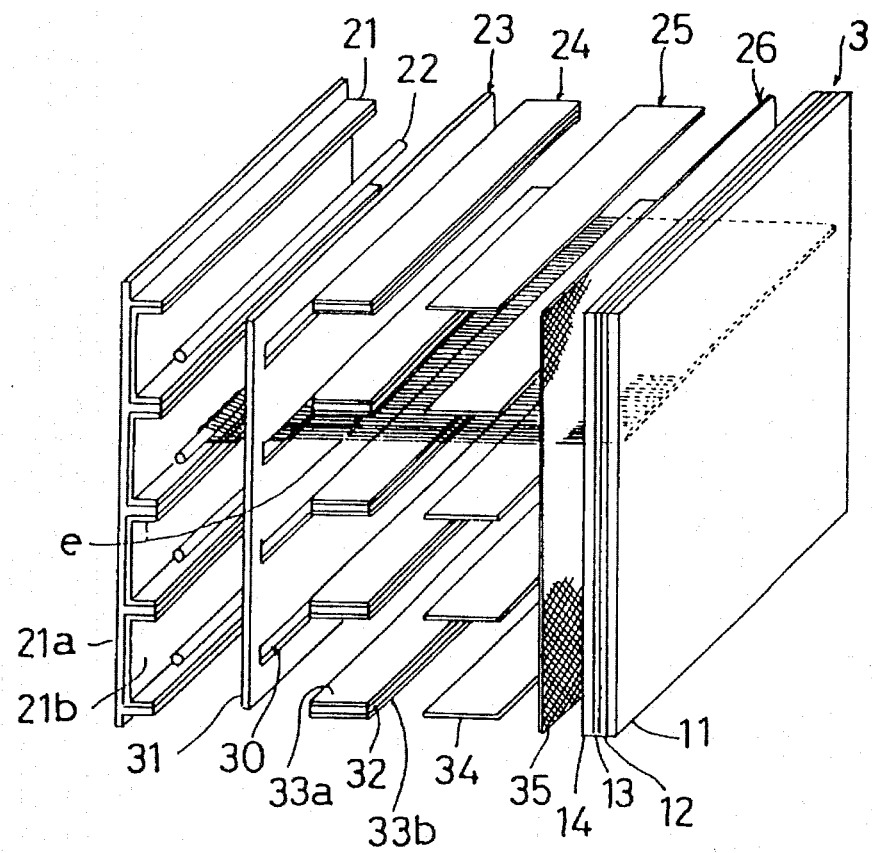
F I G. 6
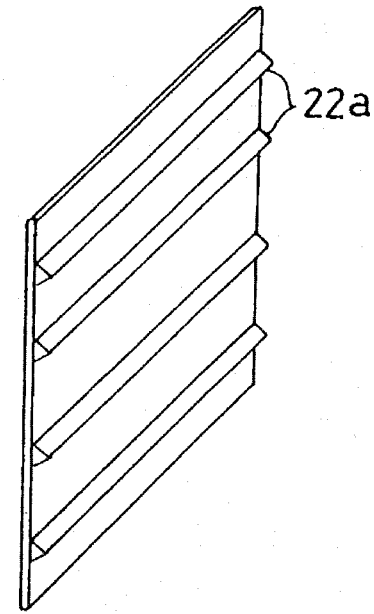

To reading circuits 5

METHOD AND APPARATUS FOR TWO-DIMENSIONAL RADIATION DETECTION

BACKGROUND OF THE INVENTION (1) Field of the Invention

This invention relates to methods and apparatus for two-dimensional radiation detection for use in converting X-ray images into electric signals in X-ray television systems used in medical diagnosis or non-destructive material testing, or converting, into electric signals, visible light resulting from optical reading of photographic subjects such as original documents.

(2) Description of the Related Art

In an X-ray television system which is one example of two-dimensional radiation detecting apparatus of the type noted above, an X-ray image intensifier and a television pickup tube are combined to convert X-ray images into electric signals. Specifically, X rays incident on the image intensifier are converted into visible rays by a converting film such as of CsI, and then electrons are released from a photoconductive surface. These electrons are accelerated and projected to an output fluorescent film to be converted into visible light, whereby the output fluorescent film outputs an image of visible light. The pickup tube is optically coupled to an output plane of the image intensifier. The image of visible light is projected through an optical lens or the like to an image pickup plane of the pickup tube, whereby electric charges corresponding to the incident light accumulate on the pickup plane. An electron beam scans and reads the electric charges, and outputs electric signals.

A two-dimensional CCD (Charge Coupled Device) camera is a well-known device for converting visible light images into electric signals.

However, to acquire final electric image signals from an X-ray image, the conventional X-ray television system having the combination of an X-ray image intensifier and a television pickup tube requires numerous steps of conversion from X rays to visible rays, then to electrons, to visible rays, through optics to visible rays, and to electric signals as noted above. Such a process tends to provide a poor efficiency of conversion, and inevitably causes a final image to have a low signal to noise (S/N) ratio. In addition, the combination of the image intensifier and image pickup tube has a drawback of complicating and enlarging the apparatus.

Although the two-dimensional CCD camera has the advantage of compactness, it is difficult to secure an enlarged area because of its construction. This results in the drawback of requiring, as indispensable elements, optics for reducing visible light images of photographic subjects.

SUMMARY OF THE INVENTION

This invention has been made having regard to the state of the art noted above, and its primary object is to provide an improved two-dimensional radiation detecting method which is capable of efficiently converting radiation such as X rays or visible light into electric signals, and allowing a two-dimensional radiation detecting apparatus to have an increased aperture size and a reduced thickness. This invention intends also to provide a two-dimensional radiation detecting apparatus for executing this method.

The above object is fulfilled, according to this invention, by a two-dimensional radiation detecting method for converting incident radiation in a two-dimensional distribution into electric signals, the method comprising the steps of:

causing the radiation in a two-dimensional distribution to strike upon a converting film to convert the radiation into electric charges in a two-dimensional distribution;

selecting, in succession, one of a plurality of linear cathodes juxtaposed and opposed to the converting film to generate electron beams from a selected linear cathode;

converging the electron beams at least vertically, and projecting the electron beams to one horizontal line on the converting film;

reading a charge (potential) distribution on the one horizontal line by detecting variations in current flowing through a plurality of stripe electrodes juxtaposed on the converting film to cross the electron beams projected;

deflecting the electron beams vertically each time the potential distribution on the one horizontal line has been read, to read a potential distribution on an adjacent horizontal line; and switching the linear cathodes after reading potential distributions on a predetermined number of horizontal lines, to read potential distributions on the predetermined number of horizontal lines with electron beams generated from a newly selected linear cathode, as above, and subsequently reading the potential distribution on the converting film by switching the linear cathodes successively.

This invention also provides a two-dimensional radiation detecting apparatus suited for executing the above method, which comprises:

a target structure for converting incident radiation in a two-dimensional distribution into electric charges in a two-dimensional distribution; and an electron beam scan mechanism for causing electron beams to scan a plane opposite to a radiation incident plane of the target structure, to read, as electric signals, a two-dimensional distribution of potentials formed on the target structure;

wherein the target structure includes a converting film for converting the incident radiation in a two-dimensional distribution into the electric charges in a two-dimensional distribution, and a plurality of stripe electrodes juxtaposed substantially equidistantly on the converting film; and the electron beam scan mechanism includes a plurality of linear cathodes acting as electron beam sources opposed to the target structure and juxtaposed to extend substantially perpendicular to the stripe electrodes, a plurality of electron beam fetching electrodes associated with the linear cathodes for causing a selected one of the linear cathodes to generate electron beams, converging the electron beams vertically and driving the electron beams forward, a plurality of vertically deflecting electrodes associated with the linear cathodes for vertically deflecting the electron beams fetched, accelerating electrodes for drawing the electron beams having passed through the vertically deflecting electrodes toward the target structure, and a decelerating electrode for decelerating the electron beams having passed through the accelerating electrodes before incidence on the target structure.

With the above apparatus, incident radiation in a two-dimensional distribution is converted into electric signals as follows.

First, the converting film of the target structure converts the incident radiation in a two-dimensional distribution into a two-dimensional potential distribution. The electron beam scan mechanism reads the potential distribution produced on the target structure as follows. The electron beam fetching electrodes select one linear cathode from the plurality of linear cathodes, and take horizontally distributed electron beams from this linear cathode. These electron beams pass through the vertically deflecting electrodes, accelerating electrodes and decelerating electrode to strike upon the converting film of the target structure. The converting film has the stripe electrodes juxtaposed to extend substantially perpendicular to the linear cathodes (incidence lines of the electron beams). Consequently, electric current flows between the stripe electrodes and selected linear cathode in amounts corresponding to the potentials in beam incidence positions of the converting film. The potential distribution on one horizontal line on the converting film is read by detecting the current variations among the stripe electrodes. Upon completion of reading of the potential distribution on one horizontal line on the converting film, the vertically deflecting electrodes vertically deflect and shift the electron beams to an adjacent horizontal line. Then, in a manner similar to the above, variations in the current on the stripe electrodes are detected to read a potential distribution on that horizontal line. When potential distributions on a predetermined number of lines have been read, the electron beam fetching electrodes are switched to select a next linear cathode. By means of electron beams taken from this linear cathode, potential distributions on the predetermined number of lines on the converting film are read as described above. Subsequently, the other linear cathodes are selected in succession to read potential distributions over the entire area of the converting film.

With the two-dimensional radiation detecting apparatus according to this invention, an incident radiation image is converted into potentials in a two-dimensional distribution which are scanned by electron beams to obtain electric signals. This process involves few converting steps from incidence of the radiation image to acquisition of electric signals, thereby realizing image signals of high S/N ratio.

Further, according to this invention, potential distributions on the converting film along the incidence lines of electron beams are read by the stripe electrodes juxtaposed to cross the incidence lines of electron beams. Thus, the electron beams have a minimal scanning range in that direction to diminish a band of signals, thereby improving S/N ratio correspondingly.

The electron beam scan mechanism uses a plurality of linear cathodes as electron beam sources. Compared with use of a single electron gun, this scan mechanism requires a reduced passage length for scanning the electron beams, thereby to allow the two-dimensional radiation detecting apparatus to have a correspondingly reduced thickness. Besides, since the electron beams need not be shifted through a wide range, images will have little distortion in peripheral portions thereof.

The converting film for converting radiation in a two-dimensional distribution into a potential distribution has a construction readily adaptable for an increased area. Thus, the two-dimensional radiation detecting apparatus according to this invention may have an increased aperture size.

In a preferred form of the apparatus according to this invention, each of the stripe electrodes has a horizontal width corresponding to one pixel, and the electron beam scan mechanism is operable to project simultaneously the electron beams distributed linearly to one horizontal line on the converting film, and to read a potential distribution on the one horizontal line simultaneously by detecting current variations of the stripe electrodes when the electron beams are projected to the converting film.

With this construction, the potential distribution on one horizontal line on the converting film may be read simultaneously without shifting the electron beams horizontally.

In another preferred form of the apparatus according to this invention, each of the stripe electrodes has a horizontal width corresponding to a plurality of pixels; and the electron beam scan mechanism further includes electron beam flow control electrodes for separating the electron beams taken from the selected one of the linear cathodes into a plurality of discrete electron beams arranged horizontally, a horizontally converging electrode for horizontally converging each of the discrete electron beams, and horizontally deflecting electrodes for horizontally and simultaneously deflecting the electron beams converged horizontally, within the widths of the stripe electrodes, respectively, whereby the electron beams converged vertically and horizontally by the vertically and horizontally converging electrodes strike upon one horizontal line on the converting film, to read a potential distribution on the one horizontal line by detecting current variations of the stripe electrodes when the electron beams are horizontally shifted by the plurality of pixels corresponding to the width of each stripe electrode.

With this construction, each of the discrete electron beams simultaneously scans the plurality of pixels corresponding to the width of one stripe electrode, whereby the electron beams read the potential distribution on one horizontal line on the converting film.

An X-ray image pickup tube is a specific example of two-dimensional radiation detecting apparatus according to this invention. In this case, the converting film of the target structure includes a fluorescent element for converting X rays incident as the radiation in a two-dimensional distribution into a visible light image, and a photoconductive film for converting the visible light image into electric charges in a two-dimensional distribution. Further, it is preferred that the stripe electrodes are transparent electrodes, and that the fluorescent element, stripe electrodes and photoconductive film are laminated in the stated order.

Preferably, the electron beam fetching electrodes are in the form of a plurality of backing electrodes arranged rearwardly (at a side remote from the target structure) of the linear cathodes and electrically separated from one another, and a vertically converging electrode for selectively producing potential gradients with the backing electrodes to take the electron beams from one of the linear cathodes, and vertically converging the electron beams.

In the case of the X-ray image pickup tube mentioned above, the fluorescent element preferably comprises a needle crystal structure of sodium-doped cesium iodide from the point of view of X-ray converting efficiency. In this case, the fluorescent element has an uneven surface. Thus, when a voltage is applied between the transparent electrodes and linear cathodes, strong electric fields could concentrate on the photoconductive film to damage the photoconductive film. To avoid such an inconvenience, it is preferred that the fluorescent element has a smoothed surface, or the fluorescent element and the stripe electrodes have a smooth translucent layer interposed therebetween.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 3 is a view showing an electron beam scan mechanism;

FIG. 6 is an explanatory view of modified linear cathodes.

DETAILED DESCRIPTION OF THE PREFERRED EMBODIMENTS

Preferred embodiments of the present invention will be described in detail hereinafter with reference to the drawings.

First Embodiment

Figure 1:
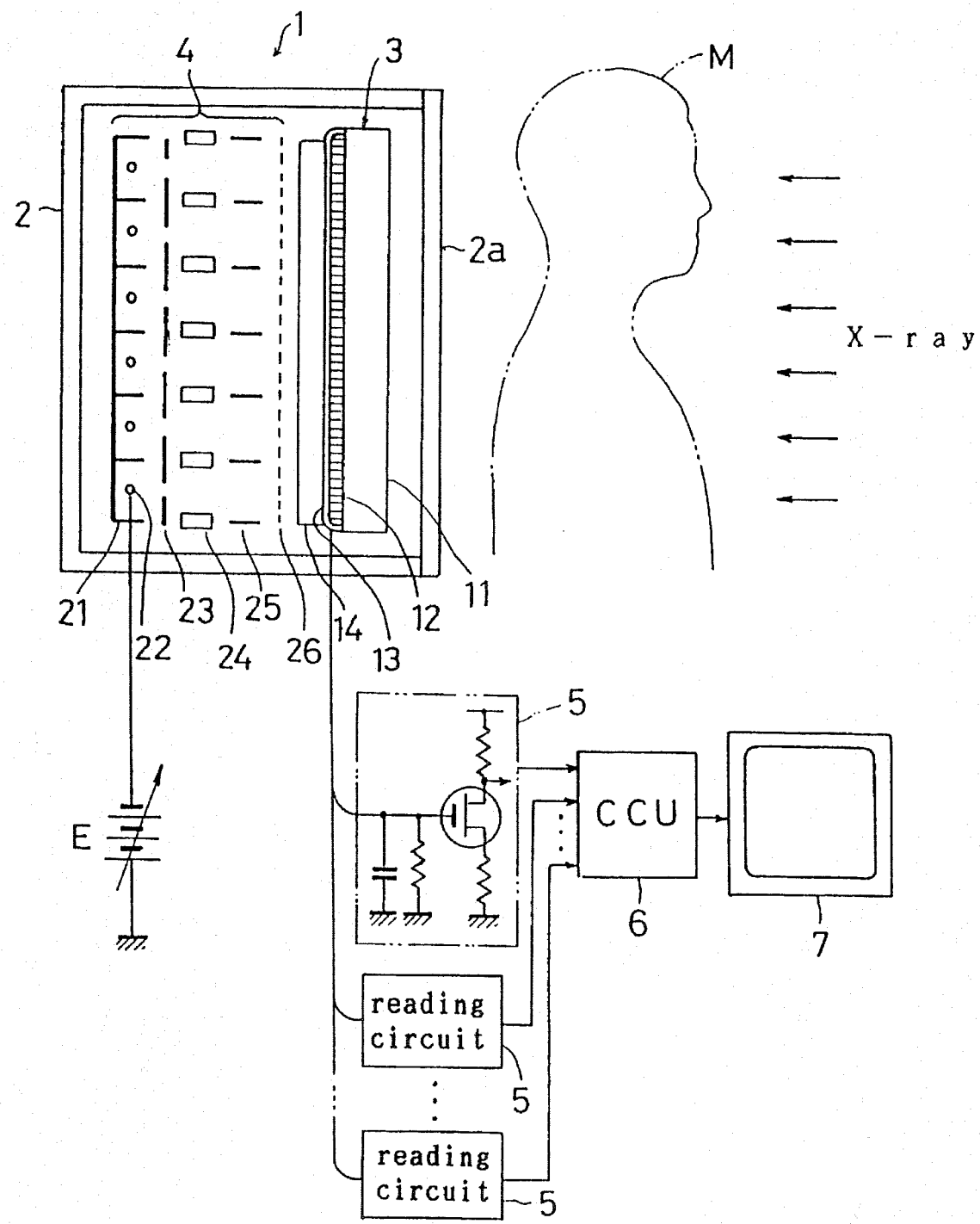
FIG. 1 is a schematic view showing an outline of an X-ray image pickup tube which is one example of two-dimensional radiation detecting apparatus embodying this invention.

FIG. 1 is a schematic view of an X-ray image pickup tube which is one example of two-dimensional radiation detecting apparatus embodying this invention.

As shown in FIG. 1, the X-ray image pickup tube 1 includes a vacuum housing 2 maintained in a vacuum condition of $10^{-7}$ to $10^{-9}$ Torr, and a target structure 3 and a electron beam scan mechanism 4 mounted in the housing 2. The target structure 3 converts incident X rays in a two-dimensional distribution into electric charges in the two-dimensional distribution. The electron beam scan mechanism 4 causes electron beams to scan a plane opposite to an X-ray incident plane of the target structure 3, thereby to read, as electric signals, a two-dimensional distribution of potentials formed on the target structure 3.

Figure 2A:
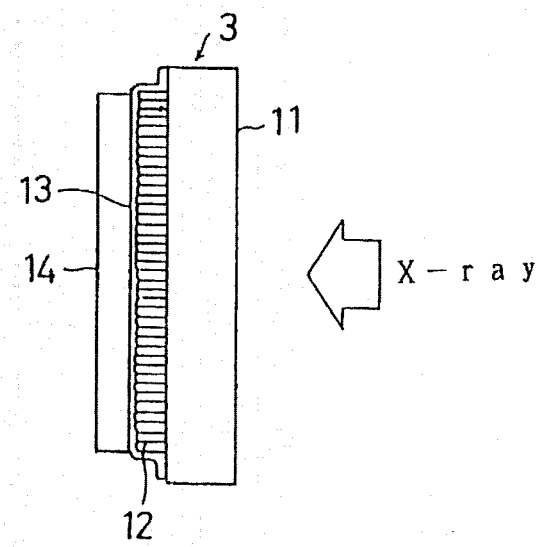
FIGS. 2A through 2C are views showing a target structure.
Figure 2C:
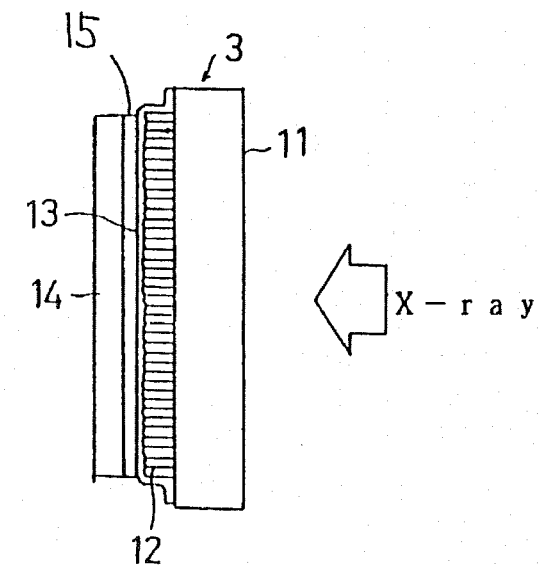
Figure 2B:
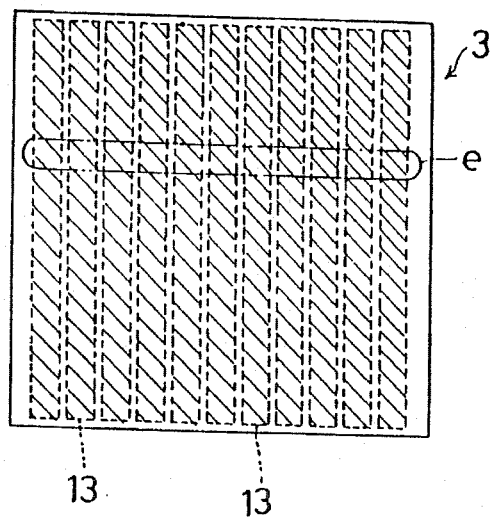

As schematically shown in section in FIG. 2A and in plan in FIG. 2B, the target structure 3 includes a substrate 11, a fluorescent element 12 formed on a non-incident surface of the substrate 11, transparent electrodes 13 in a plurality of stripes formed on the fluorescent element 12, and a photoconductive film 14 formed on the transparent electrodes 13.

The substrate 11 serves to secure a mechanical strength of the target structure 3, and is formed of an X-ray penetrable material, such as aluminum, metallic beryllium, glass or ceramic, having a thickness of 1 to 2 mm.

The fluorescent element 12 is formed of a material responsive to X rays to produce visible rays, such as sodium-doped cesium iodide (CsI:Na), silver-doped zinc sulfide (ZnS:Ag), calcium tangstate (CaWO$_4$) or thallium-doped cesium iodide (CsI:Tl). In particular, a needle crystal structure of CsI:Na is preferred from the point of view of X-ray converting efficiency. The layer thickness of CsI:Na is normally in the order of 200 to 400 μm.

The transparent electrodes 13 are formed of a translucent electroconductive film such as of ITO which is an alloy of indium, tin and oxygen, or SnO$_2$. The translucent electrodes 12 are formed as thin as possible (approximately 300 Å) to avoid scattering of light. The number of transparent electrodes 13 in stripes juxtaposed to extend vertically is selected as appropriate, taking the horizontal resolving power of the X-ray image pickup tube 1 into account. This embodiment has 1,000 transparent electrodes 13 in stripes.

The photoconductive film 14 converts a two-dimensional visible light image formed on the fluorescent element 12 into electric charges in a two-dimensional distribution, and has sensitivity for an emission wavelength range of the fluorescent element 12. Where, for example, the fluorescent element 12 is formed of blue glow CsI:Na, Zns:Ag or CaWO$_4$, the photoconductive film 14 preferably is formed of an amorphous semiconductor layer (a-Se) having selenium (Se) as a main component. Where the fluorescent element 12 is formed of green glow CsI:Tl, the photoconductive film 14 is formed of cadmium selenide (CdSe).

The above target structure 3 is manufactured as follows, for example.

First, the fluorescent element 12 is formed on one surface of the substrate 11 by depositing CsI:Na thereon by vacuum evaporation. At this time, the needle crystal structure of CsI:Na is obtained by maintaining the substrate 11 at 200° to 400° C. ITO is deposited on the surface of the fluorescent element 12 by vacuum evaporation or sputtering. Then, the transparent electrodes 13 are formed in stripes by photolithography. The photoconductive film 14 is formed by depositing a-Se or the like on the transparent electrodes 13 by vacuum evaporation.

Next, the construction of electron beam scan mechanism 4 will be described with reference to FIG. 3.

This mechanism includes, as arranged successively from left to right in FIG. 3, backing electrodes 21, linear cathodes 22 acting as electron beam sources, a vertically converging electrode 23, vertically deflecting electrodes 24, electron beam accelerating electrodes 25 and a decelerating electrode 26. The backing electrodes 21 and vertically converging electrode 23 correspond to the electron beam fetching electrodes of this invention.

Each of the linear cathodes 22 acting as electron beam sources is supported to extend horizontally to generate electron beams distributed horizontally. A plurality of such linear cathodes 22 are arranged vertically at suitable intervals. This embodiment includes 63 linear cathodes 22 (though, for expediency of illustration, only four are shown in FIG. 3). These linear cathodes 22 are formed, for example, by coating surfaces of tungsten lines of 10 to 29 μm diameter with an oxide cathode material. As described later, the linear cathodes 22 are controlled, successively from top to bottom, to emit electron beams each for a fixed time. A high voltage E is applied between these linear cathodes 22 and the transparent electrodes 14 of target structure 3 (see FIG. 1).

Each backing electrode 21 is formed of a conductive film 21b such as of aluminum deposited, by evaporation or the like, on an inner surface of a channel formed on an insulating base 21a opposite each linear electrode 22. The backing electrodes 21 are electrically separated from one another and associated with the respective linear electrodes 22. The respective conductive films 21b of the backing electrodes 21 have functions to produce potential gradients with the vertically converging electrode 23 described later, to suppress generation of electron beams by other linear cathodes 22 than the linear cathode 22 controlled to emit electron beams for the fixed time, and to allow the electron beams generated to travel only forward. The backing electrodes 21 may be formed of a conductive material applied to an inner rear wall of the vacuum housing 2 mentioned hereinbefore.

The vertically converging electrode 23 is in the form of a conductive plate 31 defining a plurality of horizontally elongated slits 30 opposed to the linear cathodes 22, respectively. The electron beams emitted from each linear cathode 22 proceed through one of the slits 30 to be vertically converged.

Each slit 30 may have bars arranged at suitable intervals therealong. Alternatively, each slit 30 may be in the form of a row of through holes arranged horizontally at minute intervals (so that the holes are almost continuous with one another) to act substantially as a slit.

Each of the vertically deflecting electrodes 24 extends horizontally over a range corresponding to an intermediate portion of one slit 30. Each of the vertically deflecting electrodes 24 includes conductors 33a and 33b applied to upper and lower surfaces of an insulating substrate 32, respectively. A vertically deflecting voltage is applied between opposed conductors 33a and 33b to deflect electron beams vertically.

In this embodiment, a pair of conductors 33a and 33b vertically deflects electron beams from one linear cathode 22 to positions corresponding to 16 lines. This embodiment includes 64 vertically deflecting electrodes 24 to provide 63 pairs of conductors corresponding to the 63 linear cathodes 22. Consequently, the electron beams are vertically deflected to describe 1,008 horizontal lines on the photoconductive film 14 of the target structure 3.

The accelerating electrodes 25 are in the form of conductive plates 34 extending horizontally in positions similar to those of the vertically deflecting electrodes 24. These accelerating electrodes 25 act to draw or attract the electron beams.

The decelerating electrode 26 is in the form of a mesh conductor 35 defining numerous pores. The decelerating electrode 26 has a function to decelerate the electron beams immediately before the photoconductive film 14 of the target structure 3, and direct the electron beams to strike upon the photoconductive film 14 at right angles thereto.

Operation of the above embodiment will be described next.

As shown in FIG. 1, X rays transmitted through an object M travel in a two-dimensional distribution through a window 2a of the vacuum housing 2, and strike upon the target structure 3. The X rays incident on the target structure 3 pass through the substrate 11 to the fluorescent element 12 to be converted into a visible light image in a two-dimensional distribution. The visible light image is transmitted through the transparent electrodes 13 to the photoconductive film 14. The photoconductive film 14 converts the visible light image into electric charges. Consequently, a two-dimensional distribution of electric potentials corresponding to the incident X-ray image is obtained on the photoconductive film 14. The high voltage E is applied between the linear cathodes 22 and transparent electrodes 14, whereby strong electric fields act on the photoconductive film 14. Thus, the electric charges produced on the photoconductive film 14 by the incident visible light image appear as a potential distribution on the photoconductive film 14.

The potential distribution appearing on the photoconductive film 14 is read by the electron beam scan mechanism 4 as follows. The backing electrodes 21 and vertically converging electrode 23 select one of the linear cathodes 22, and take horizontally distributed electron beams "e" from this linear cathode 22 alone. These electron beams "e" strike upon the photoconductive film 14 of target structure 3 (see FIG. 2B). The photoconductive film 14 has the transparent electrodes 13 in stripes juxtaposed in a direction perpendicular to the linear cathode 22 (incidence line of electron beams "e"). Consequently, electric current flows between the transparent electrodes 13 and linear cathode 22 in amounts corresponding to the potentials in intersections of the incidence line of electron beams "e" and the transparent electrodes 13 in stripes. These variations in the current are read by reading circuits 5 connected in multiple stages to the respective transparent electrodes 13 as shown in FIG. 1.

Upon completion of reading of the potential distribution on one horizontal line on the photoconductive film 14, the vertically deflecting electrodes 24 vertically deflect and shift the electron beams "e" to an adjacent horizontal line. Then, in a manner similar to the above, variations in the current on the transparent electrodes 13 are detected to read a potential distribution on that horizontal line. When potential distributions on a predetermined number of lines (16 lines in this embodiment) have been read, the backing electrodes 21 and vertically converging electrode 23 are switched to select a next linear cathode 22. By means of electron beams "e" taken from this linear cathode 22, potential distributions on the predetermined number of lines on the photoconductive film 14 are read as described above. Subsequently, the other linear cathodes 22 are selected in succession to read potential distributions over the entire area of photoconductive film 14.

In this way, the two-dimensional potential distribution on the photoconductive film 14 is read by the respective reading circuits 5 as electric signals. These electric signals are converted into video signals by a camera control unit (CCU) 6, which are transmitted to a television monitor 7. As a result, an X-ray penetration image of the object M is displayed on the screen of the television monitor 7.

This X-ray image pickup tube 1 requires few steps for acquiring electric signals corresponding to incident X rays, i.e. the step of converting X rays into a visible light image, the step of converting the visible light image into a potential distribution, and the step of acquiring electric signals by scanning the potential distribution. Thus, little noise is generated. Consequently, X-ray penetration images appearing on the screen of the television monitor 7 have a high S/N ratio.

The above X-ray image pickup tube 1 requires no horizontally deflecting electrodes or the like since the electron beams "e" need not make horizontal scans. This feature simplifies the construction of X-ray image pickup tube 1, and diminishes a band of signals for the absence of horizontal scanning of electron beams "e", thereby to improve the S/N ratio. (S/N ratio is known to be proportional to $1/B^{3/2}$ where B is a band.)

Further, since the fluorescent element 12 and photoconductive film 14 noted above may readily be increased in area, the X-ray image pickup tube 1 may have a large aperture size to extend a field of vision to the size of a region to be examined. Besides, the electron beams successively taken from the plurality of linear cathodes 22 are vertically deflected to scan the photoconductive film 14. A relatively short passage is adequate for the purpose of deflecting the electron beams, which allows the X-ray image pickup tube 1 to have a reduced depth.

The needle crystal structure of CsI:Na used as the fluorescent element 12 has an uneven surface. Because of such a surface, when a voltage is applied between the transparent electrodes 13 and linear cathodes 22, strong electric fields tend to concentrate locally on the photoconductive film 14. As a result, pixels could be destroyed in such locations. The target structure 3 may be formed as follows to avoid this inconvenience:

(1) The surface of the fluorescent element 12 is smoothed.

(2) As shown in FIG. 2C, a smooth translucent layer 15 is interposed between the fluorescent element 12 and transparent electrodes 13. This layer may be a fiber plate, thin glass plate, polyimide resin layer or silicon oxide layer having smoothed surfaces.

Second Embodiment

In the first embodiment shown in FIG. 3, the flat (linearly distributed) electron beams "e" taken from each linear cathode 22 are directed to strike upon one horizontal line on the photoconductive film 14 simultaneously, to read the potential distribution on that horizontal line simultaneously. In this embodiment, a plurality of electron beams converged vertically as well as horizontally are caused to strike upon one horizontal line on the photoconductive film 14. Each of these electron beams simultaneously and horizontally scans a plurality of pixels corresponding to a width of each of the transparent electrodes in stripes, whereby the electron beams read a potential distribution on one horizontal line on the photoconductive film 14. This feature will be described hereinafter with reference to FIGS. 4 and 5.

Figure 4:
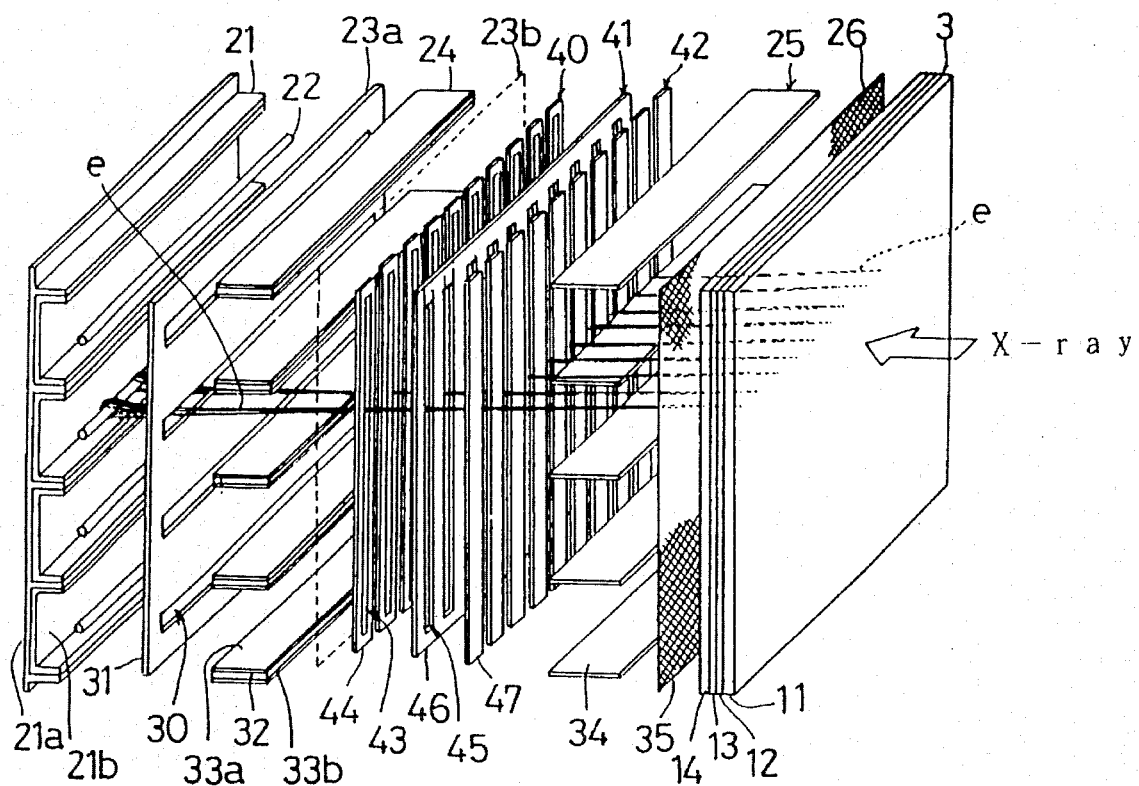
FIG. 4 is a view showing a modified electron beam scan mechanism.

FIG. 4 shows an outline of an electron beam scan mechanism opposed to the target structure 3. This mechanism includes, as arranged successively from left to right in FIG. 4, backing electrodes 21, linear cathodes 22, vertically converging electrodes 23a and 23b, vertically deflecting electrodes 24, electron beam flow control electrodes 40, a horizontally converging electrode 41, horizontally deflecting electrodes 42, electron beam accelerating electrodes 25 and a decelerating electrode 26. The backing electrodes 21, linear cathodes 22, vertically converging electrodes 23a and 23b, vertically deflecting electrodes 24, electron beam accelerating electrodes 25 and decelerating electrode 26 are similar to those in the first embodiment shown in FIG. 3, and will not be described here. The target structure 3 has the same basic construction as in the first embodiment. However, in the second embodiment, each of the transparent electrodes 13 in stripes has a greater horizontal width than in the first embodiment, i.e. a width corresponding to a plurality of pixels (three pixels in the example shown in FIG. 5). Consequently, the number of stripe electrodes 13 in this embodiment is less than that in the first embodiment. Where each stripe electrode 13 has a width corresponding to three pixels as noted above, the number of stripe electrode 13 is about one third of that in the first embodiment.

Each of the electron beam flow control electrodes 40 comprises a conductive plate 44 defining a vertically elongated slit 43. The flow control electrodes 40 are arranged horizontally at suitable intervals. Each flow control electrode 40 allows the electron beams to pass therethrough only during periods of beam selecting signal reception. In this embodiment, the electron beams are taken out separately through the respective flow control electrodes 40. Each electron beam is used to read signals (potential distribution on the photoconductive film 14) from a plurality of pixels (three in this embodiment) arranged horizontally.

The horizontally converging electrode 41 is in the form of a conductive plate 46 defining a plurality of vertically elongated slits 45 opposed to the slits 43 in the electron beam flow control electrodes 40, respectively. Each of the electron beams is horizontally converged to a thin electron beam corresponding in size to one pixel.

Each of the horizontally deflecting electrodes 42 is in the form of a conductive plate 47 extending vertically over a range corresponding to an intermediate portion of one slit 45. A horizontally deflecting voltage is applied between adjacent deflecting electrodes 42. As a result, electron beams passing between adjacent deflecting electrodes 42 are horizontally and simultaneously deflected to scan horizontally and simultaneously regions of the photoconductive film 14 each corresponding to the plurality of pixels.

Figure 5:
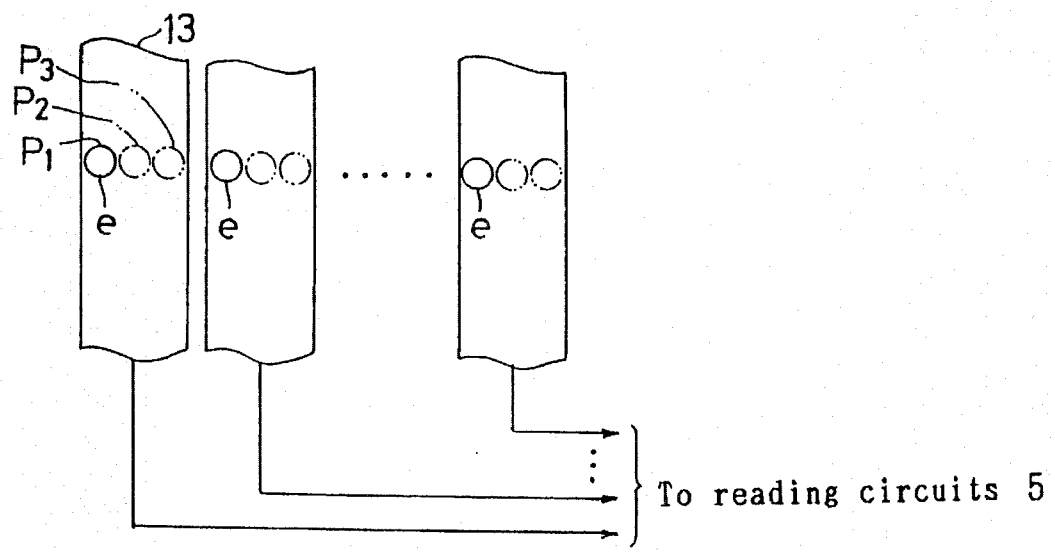
FIG. 5 is an explanatory view showing a horizontal scan of electron beams.

The electron beam scan mechanism reads the potential distribution appearing on the photoconductive film 4 as follows. The backing electrodes 21 and vertically converging electrodes 23a and 23b select one of the linear cathodes 22, and take horizontally distributed electron beams "e" from this linear cathode 22 alone. These electron beams "e" enter the electron beams flow control electrodes 40 through the vertically deflecting electrodes 24, whereby the electron beams "e" are taken out in a plurality of discrete beams. The divided, discrete electron beams "e" travel through the horizontally converging electrode 41, horizontally deflecting electrodes 42, electron beam accelerating electrodes 25 and decelerating electrode 26 to strike upon the photoconductive film 14 of target structure 3 simultaneously. FIG. 5 shows the electron beams "e" incident on the photoconductive film 14. As seen, each electron beam "e" strikes upon the leftward end position (referenced P1 in FIG. 5) of one of the transparent electrodes 13 in stripes at start of the horizontal scan. As a result, the potentials in positions of the photoconductive film 14 corresponding to the leftward end positions P1 of the respective transparent electrodes 13 are read by the reading circuits 5 connected to the transparent electrodes 13.

When the potentials corresponding to the positions P1 have been read, the horizontally deflecting electrodes 42 horizontally shift the discrete electron beams "e" by one pixel all at once. As a result, the potentials in positions of the photoconductive film 14 corresponding to the middle positions P2 of the transparent electrodes 13 are read simultaneously. After reading of the potentials corresponding to the positions P2, the electron beams "e" are shifted horizontally by one pixel again, whereby the potentials in positions of the photoconductive film 14 corresponding to the rightward end positions P3 of the transparent electrodes 13 are read simultaneously. Thus, the electron beams "e" horizontally shifted from position P1 to position P3 read the potential distribution on one horizontal line on the photoconductive film 14.

Upon completion of reading of the potential distribution on one horizontal line, the vertically deflecting electrodes 24 vertically deflect and shift the electron beams "e" by one pixel, as in the first embodiment, to read a potential distribution on an adjacent horizontal line. When potential distributions on a predetermined number of lines have been read, the linear cathodes 22 are switched to read potential distributions on a next predetermined number of lines as described hereinbefore. Subsequently, the other linear cathodes 22 are selected in succession to read potential distributions over the entire area of photoconductive film 14.

This invention is not limited to the foregoing embodiments, but may be modified in varied ways. Take the first embodiment for example, the linear cathodes of the electron beam scan mechanism are not limited to the construction shown in FIG. 3. For example, a plurality of wedge-shaped linear cathodes 22a as shown in FIG. 6 may be employed. With this construction, the electron beams "e" spread horizontally may be selectively taken from the linear cathodes 22a by applying a strong electric field to a desired one of linear cathodes 22a without heating the linear cathode 22. The linear cathodes may be rigorously arranged to correspond in number to the horizontal lines, which will dispense with the structure for vertically deflecting the electron beams, thereby to realize a detector having a reduced depth.

In the foregoing embodiments, the X-ray image pickup tube 1 is described as one example of two-dimensional radiation detectors. This invention is not limited to these embodiments, but is applicable also where incident radiation is visible light. In this case, naturally the fluorescent element 12 is excluded from the target structure.

The present invention may be embodied in other specific forms without departing from the spirit or essential attributes thereof and, accordingly, reference should be made to the appended claims, rather than to the foregoing specification, as indicating the scope of the invention.

What is claimed is:

1. A two-dimensional radiation detecting method for converting incident radiation in a two-dimensional distribution into electric signals, said method comprising the steps of:

causing the radiation in a two-dimensional distribution to strike upon a converting film to convert the radiation into electric charges in a two-dimensional distribution;

selecting, in succession, one of a plurality of linear cathodes juxtaposed and opposed to said converting film to generate electron beams from a selected linear cathode;

converging said electron beams at least vertically, and projecting said electron beams to one horizontal line on said converting film;

reading a charge (potential) distribution on said one horizontal line by detecting variations in current flowing through a plurality of stripe electrodes juxtaposed on said converting film to cross said electron beams projected;

deflecting said electron beams vertically each time the potential distribution on said one horizontal line has been read, to read a potential distribution on an adjacent horizontal line; and switching said linear cathodes after reading potential distributions on a predetermined number of horizontal lines, to read potential distributions on said predetermined number of horizontal lines with electron beams generated from a newly selected linear cathode, as above, and subsequently reading the potential distribution on said converting film by switching said linear cathodes successively.

2. A two-dimensional radiation detecting apparatus for converting incident radiation in a two-dimensional distribution into electric signals, said apparatus comprising:

a target structure for converting incident radiation in a two-dimensional distribution into electric charges in a two-dimensional distribution; and an electron beam scan mechanism for causing electron beams to scan a plane opposite to a radiation incident plane of said target structure, to read, as electric signals, a two-dimensional distribution of potentials formed on said target structure;

wherein said target structure includes a converting film for converting said incident radiation in a two-dimensional distribution into said electric charges in a two-dimensional distribution, and a plurality of stripe electrodes juxtaposed substantially equidistantly on said converting film; and said electron beam scan mechanism includes a plurality of linear cathodes acting as electron beam sources opposed to said target structure and juxtaposed to extend substantially perpendicular to said stripe electrodes, a plurality of electron beam fetching electrodes associated with said linear cathodes for causing a selected one of said linear cathodes to generate electron beams, converging said electron beams vertically and driving said electron beams forward, a plurality of vertically deflecting electrodes associated with said linear cathodes for vertically deflecting said electron beams fetched, accelerating electrodes for drawing said electron beams having passed through said vertically deflecting electrodes toward said target structure, and a decelerating electrode for decelerating said electron beams having passed through said accelerating electrodes before incidence on said target structure.

3. An apparatus as defined in claim 2, wherein:

each of said stripe electrodes has a horizontal width corresponding to one pixel; and said electron beam scan mechanism is operable to project simultaneously said electron beams distributed linearly to one horizontal line on said converting film, and to read a potential distribution on said one horizontal line simultaneously by detecting current variations of said stripe electrodes when said electron beams are projected to said converting film.

4. An apparatus as defined in claim 2, wherein:

each of said stripe electrodes has a horizontal width corresponding to a plurality of pixels; and said electron beam scan mechanism further includes electron beam flow control electrodes for separating said electron beams taken from said selected one of said linear cathodes into a plurality of discrete electron beams arranged horizontally, a horizontally converging electrode for horizontally converging each of said discrete electron beams, and horizontally deflecting electrodes for horizontally and simultaneously deflecting the electron beams converged horizontally, within the widths of said stripe electrodes, respectively, whereby said electron beams converged vertically and horizontally by said vertically and horizontally converging electrodes strike upon one horizontal line on said converting film, to read a potential distribution on said one horizontal line by detecting current variations of said stripe electrodes when said electron beams are horizontally shifted by the plurality of pixels corresponding to the width of each stripe electrode.

5. An apparatus as defined in claim 2, wherein:

said converting film includes a fluorescent element for converting X rays incident as said radiation in a two-dimensional distribution into a visible light image, and a photoconductive film for converting said visible light image into electric charges in a two-dimensional distribution;

said stripe electrodes are transparent electrodes; and said fluorescent element, said stripe electrodes and said photoconductive film are laminated in the stated order.

6. An apparatus as defined in claim 2, wherein said electron beam fetching electrodes include a plurality of backing electrodes arranged rearwardly (at a side remote from said target structure) of said linear cathodes and electrically separated from one another, and a vertically converging electrode for selectively producing potential gradients with said backing electrodes to take said electron beams from one of said linear cathodes, and vertically converging said electron beams.

7. An apparatus as defined in claim 5, wherein said fluorescent element comprises a needle crystal structure of sodium-doped cesium iodide.

8. An apparatus as defined in claim 7, wherein said fluorescent element has a smoothed surface.

9. An apparatus as defined in claim 7, wherein said fluorescent element and said stripe electrodes have a smooth translucent layer interposed therebetween.

* * * * *